May 5, 1931.   W. C. LEWIS ET AL   1,804,262
AUTOMOBILE BOAT
Filed June 20, 1930   5 Sheets-Sheet 1

WALTER C. LEWIS &
HOWARD T. POWERS INVENTORS

BY Victor J. Evans
ATTORNEY

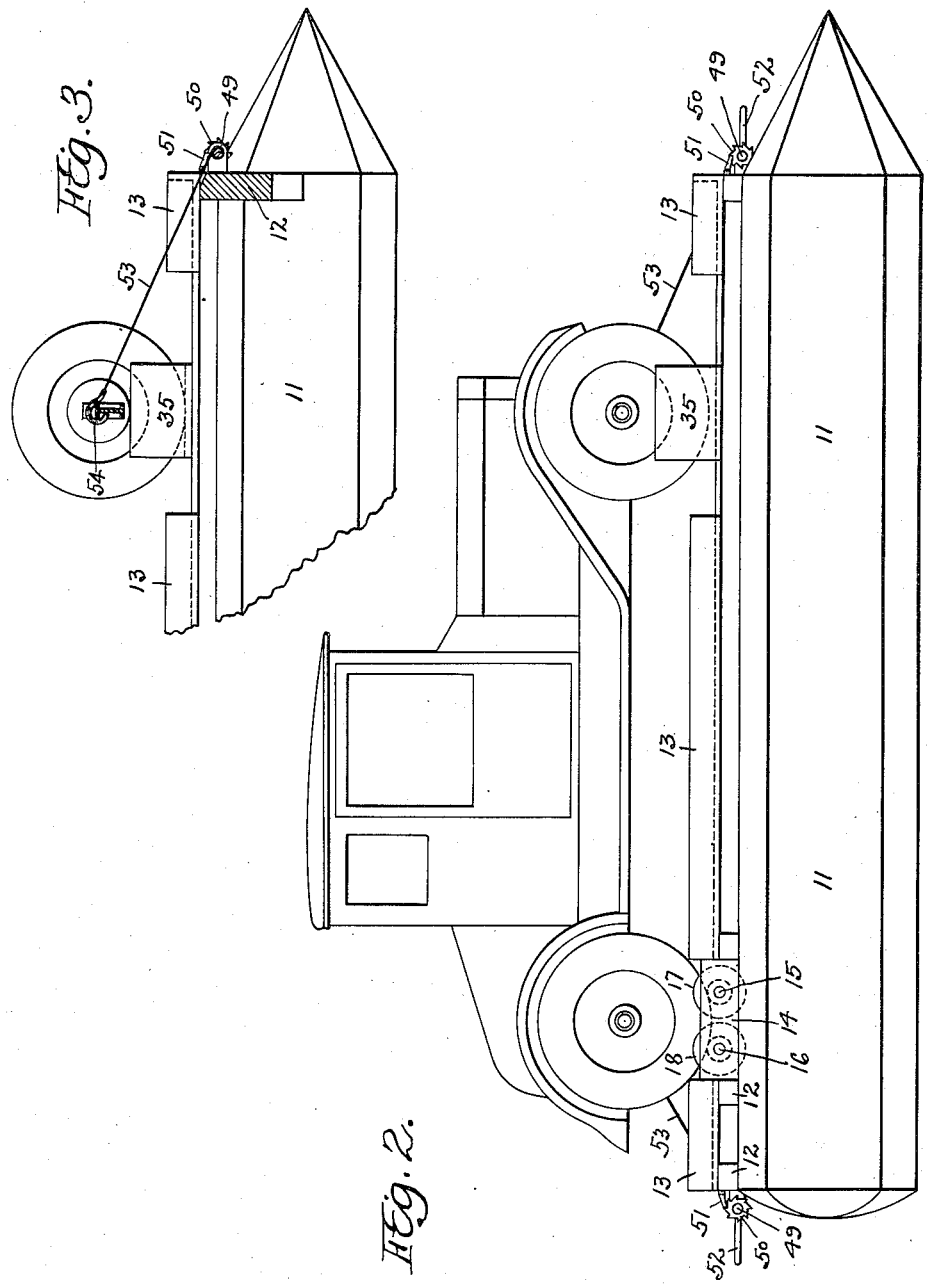

May 5, 1931. W. C. LEWIS ET AL 1,804,262
AUTOMOBILE BOAT
Filed June 20, 1930 5 Sheets-Sheet 3
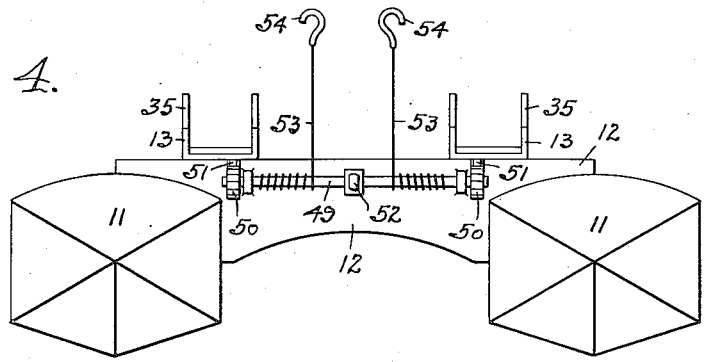
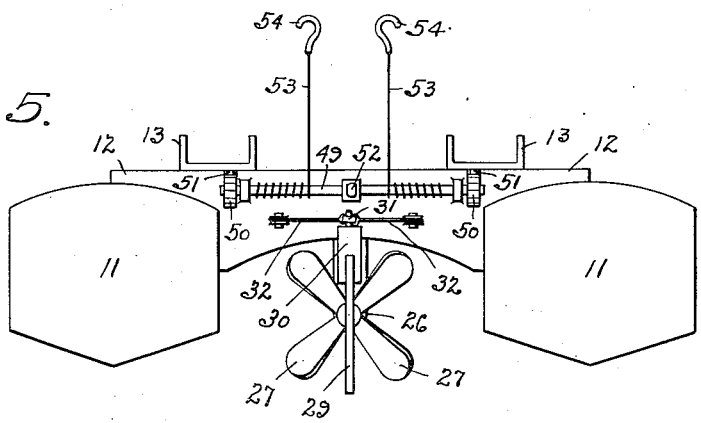
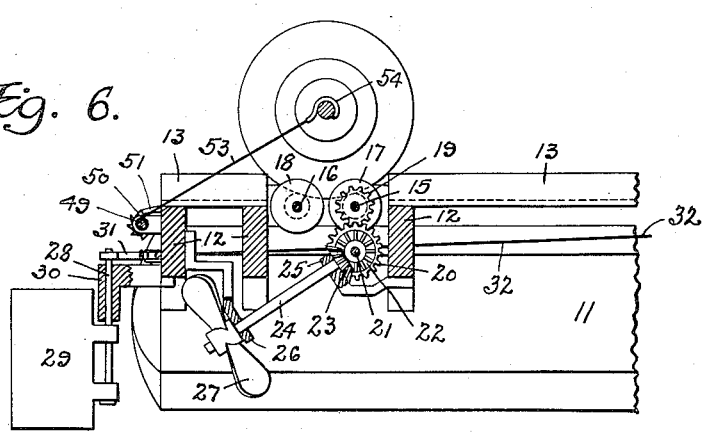
WALTER C. LEWIS &
HOWARD T. POWERS INVENTORS
BY Victor J. Evans
ATTORNEY
WITNESS:

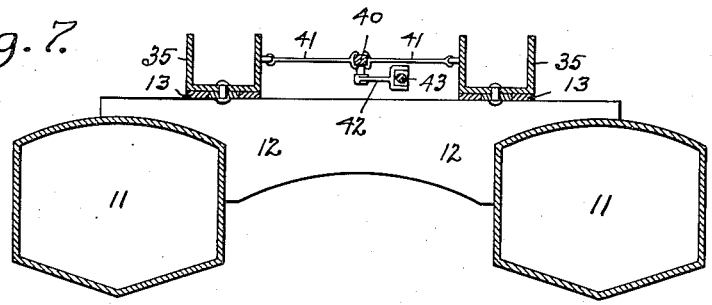
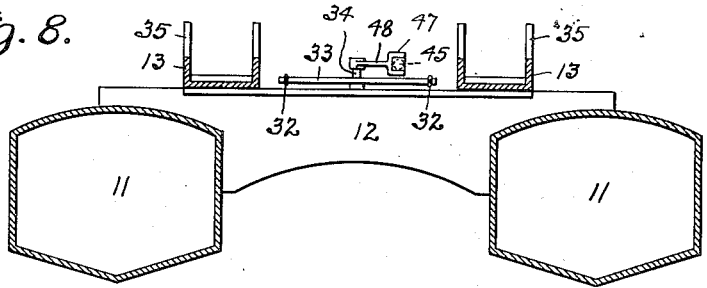
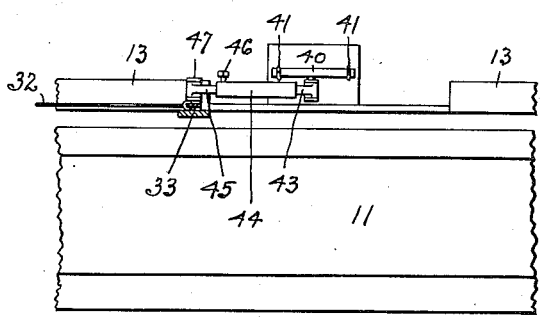
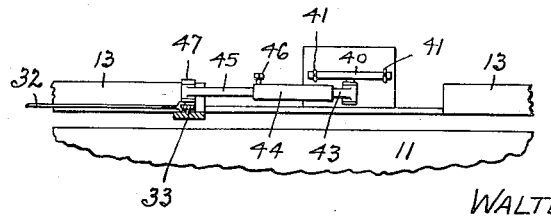

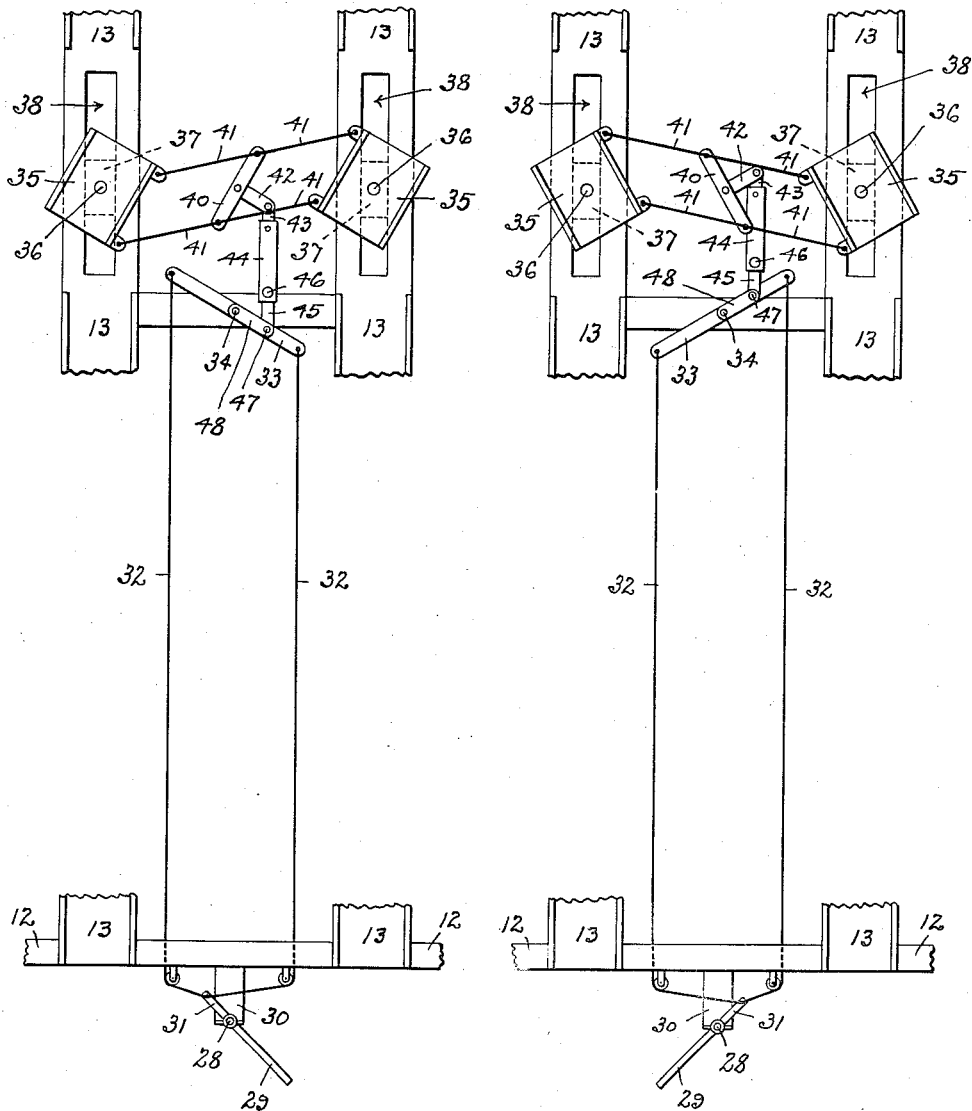

Patented May 5, 1931

1,804,262

UNITED STATES PATENT OFFICE

WALTER C. LEWIS AND HOWARD T. POWERS, OF CORPUS CHRISTI, TEXAS

AUTOMOBILE BOAT

Application filed June 20, 1930. Serial No. 462,574.

This invention relates to boats and has especial relation to boats of the pontoon type, an object being to provide a boat by means of which an automobile may be transported over the water with the power of the automobile used for driving the boat and the steering mechanism of said automobile used for controlling the direction of travel.

Another object of the invention is the provision of means carried by the boat for receiving and engaging the wheels of the automobile to supply power for and to steer the boat, means being provided whereby the wheel engaging means may be adjusted for automobiles of different wheel bases.

Another object of the invention is the provision of a boat which, in addition to the above and other advantageous features, is simple, light and durable in construction and easily controlled.

With the above and other objects in view, the invention further includes the following novel features and details of construction, to be hereinafter more fully described, illustrated in the accompanying drawings and pointed out in the appended claim.

In the drawings:—

Figure 2 is a side view of the same showing an automobile in position upon the boat.

Figure 3 is a fragmentary vertical longitudinal sectional view through the forward end of the boat and illustrating the means for holding the automobile in position.

Figure 4 is a front elevation of the boat.

Figure 5 is a rear view.

Figure 6 is a fragmentary vertical longitudinal sectional view illustrating the propeller mechanism and the means for holding the automobile in position.

Figure 1:
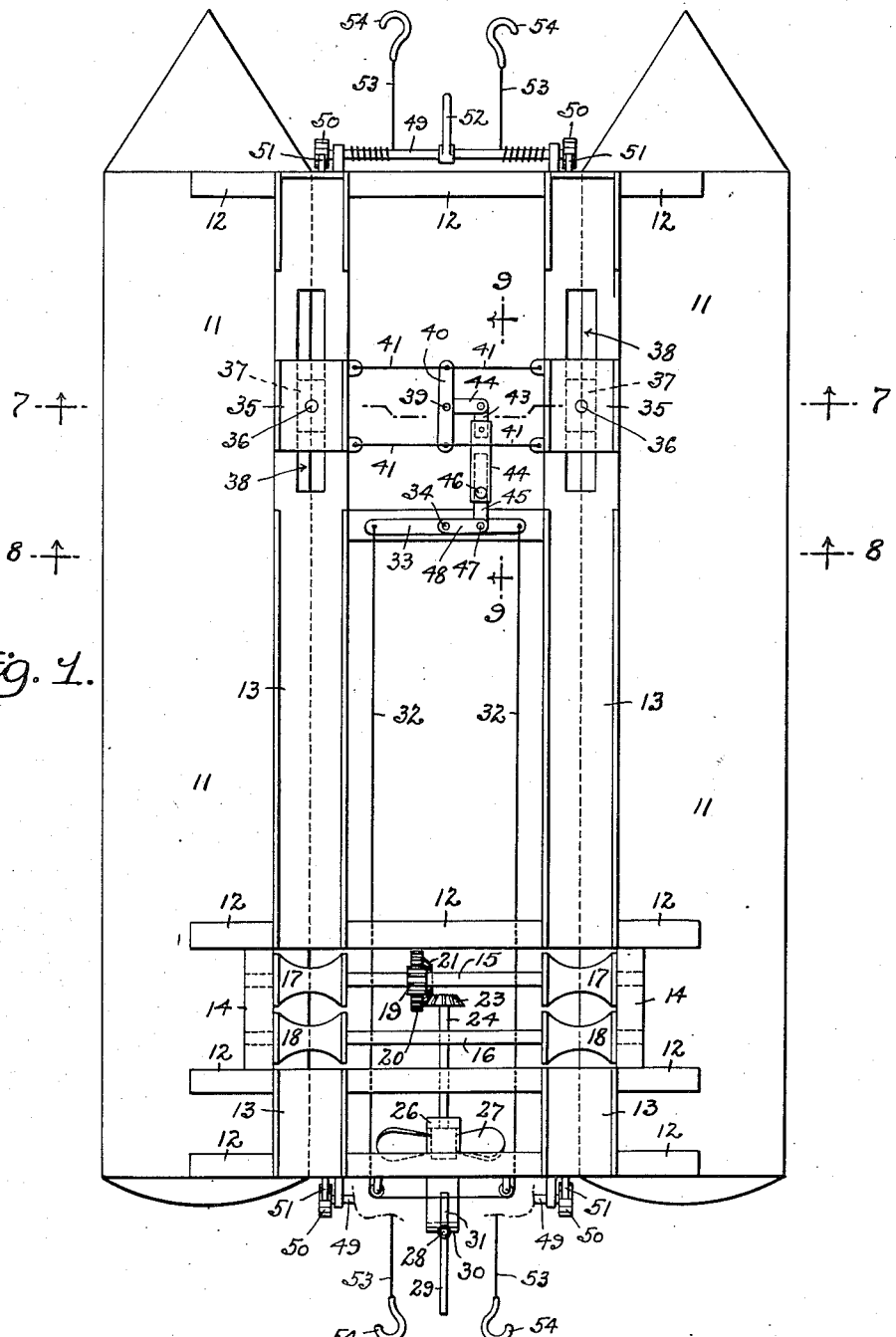
Figure 1 is a plan view of a boat constructed in accordance with the invention.

Figures 7, 8 and 9 are sectional views taken respectively on the lines 7—7, 8—8 and 9—9 of Figure 1.

Figure 10 is a view similar to Figure 9 showing the boat adjusted for the accommodation of an automobile having a longer wheel base.

Figures 11 and 12 are fragmentary views illustrating the means for steering the boat.

Referring to the drawings in detail wherein like characters of reference denote corresponding parts, the reference character 11 indicates a pair of pontoons. These pontoons are made of suitable material and of hollow construction, and may be provided with suitable normally closed clean out openings for the removal of seepage.

The pontoons are connected by cross beams 12 which are suitably secured thereto and which have mounted thereon tracks 13. These tracks are channel shaped in cross section and are designed to accommodate and guide the wheels of an automobile.

Mounted in bearing blocks 14 secured between two of the beams 12 are shafts 15 and 16. These shafts carry rollers 17 and 18 respectively, the rollers 18 being idler rollers.

The rollers are preferably concaved as shown to receive the wheels of the automobile. Mounted upon the shaft 15 is a pinion 19 which drives a gear 20 mounted upon a short countershaft 21. The gear 20 has fast thereto a beveled pinion 22, which engages and drives a beveled pinion 23 fast upon the inner end of an inclined propeller shaft 24. This shaft 24 is mounted in bearing brackets 25 and 26 and carries a propeller 27 at its outer end. Rotation of the rollers 17 will thus operate the propeller 27.

Secured to a rudder post 28 is a rudder 29. This post is mounted in a bearing bracket 30 and has secured upon its upper end a tiller 31.

Cables 32 are connected to this tiller and extend laterally and forwardly and have their forward ends connected to a rudder bar 33. This bar is pivotally mounted upon a post 34.

Positioned within the tracks 13 at the forward end of the boat are shoes 35. These shoes are transversely channel shaped to receive the front wheels of an automobile and are mounted for pivotal movement upon pivot posts 36. These posts are carried by blocks 37 which are slidingly mounted in openings 38 which extend longitudinally of the tracks 13. As the rear wheels of the automobile are adapted to be positioned upon the rollers 17 and 18, and the front wheels within the shoes 35, the said shoes may be adjusted longitudinally of the tracks through the sliding block connection, so as to accommodate the boat to automobiles of different wheel bases. The side walls of the tracks 13 are interrupted upon opposite sides of the openings 38 so as to permit of free pivotal movement of the shoes as shown in Figures 11 and 12 of the drawings.

Pivotally mounted between the shoes 35 as shown at 39 is a steering bar 40, and this bar is connected with the shoes 35 by means of cables 41. Rigid with the bar 40 is an arm 42 which has pivotally connected thereto a link 43. This link is received and secured within one end of a hollow bar 44, while extending from the opposite end of this hollow bar is an arm 45. The arm 45 is adjustably secured to the bar 44 as shown at 46 and is pivotally connected as at 47 with one end of an arm 48, the latter being fast upon the post 34.

After the automobile has been driven upon the tracks 13 and the front wheels positioned within the shoes 35, with the rear wheels resting upon the rollers 17 and 18, it is secured in this position against accidental movement. For this purpose, the boat has mounted for rotation at opposite ends, shafts 49. These shafts have secured thereon ratchet wheels 50 which are engaged by pivotally mounted dogs 51. An operating handle 52 has a ratchet engagement with the shafts 49 so that the latter may be rotated in one direction and held against rotation in an opposite direction by the dogs 51. Cables 53 are wound upon the shafts 49 and carry hooks 54 at their outer ends. These hooks are designed to be removably engaged with the front and rear axles of the automobile and when the cables are properly adjusted the automobile will be held against movement in either direction.

Rotation of the rear wheel of the automobile will drive the propeller through the driving rollers 17, while operation of the steering wheel of the automobile will move the shoes pivotally and operate the rudder 29 to steer the boat, as shown in Figures 11 and 12 of the drawings.

In order to back the automobile off of the rollers 17 and 18, the idler rollers 18 may be chocked by any suitable means to provide traction.

The invention is susceptible of various changes in its form, proportions and minor details of construction and the right is herein reserved to make such changes as properly fall within the scope of the appended claim.

Having described the invention what is claimed is:—

In a boat for automobiles, a pair of spaced pontoons, means connecting the pontoons to hold them in spaced parallel relation, a trackway extending longitudinally of the pontoons upon the connecting means to receive and guide the wheels of an automobile, pairs of parallel rollers rotatably mounted in said trackway for engagement by the wheels of the automobile, a propeller, means operated by one of the rollers of each pair and connected with the propeller to drive the latter, a rudder, a pair of shoes located in the trackway for engagement by the front wheels of the automobile, means to pivotally and slidingly mount said shoes to adjust the latter in accordance with the wheel base of the automobile, means connecting the shoes, and adjustable means connecting the shoe connecting means with the the rudder to operate the latter when the steering mechanism of the automobile is operated.

In testimony whereof we affix our signatures.

WALTER C. LEWIS.
HOWARD T. POWERS.